US012249436B2

(12) United States Patent
Kawahara et al.

(10) Patent No.: US 12,249,436 B2
(45) Date of Patent: Mar. 11, 2025

(54) RADIATION SHIELDING MATERIAL

(71) Applicant: ADEGG CO., LTD., Tokyo (JP)

(72) Inventors: Nobumasa Kawahara, Tokyo (JP); Yoshihiko Suzuki, Shizuoka (JP)

(73) Assignee: ADEGG CO., LTD (JP)

( * ) Notice: Subject to any disclaimer, the term of this patent is extended or adjusted under 35 U.S.C. 154(b) by 316 days.

(21) Appl. No.: 17/769,654

(22) PCT Filed: Oct. 8, 2020

(86) PCT No.: PCT/JP2020/038134
§ 371 (c)(1),
(2) Date: Apr. 15, 2022

(87) PCT Pub. No.: WO2021/100350
PCT Pub. Date: May 27, 2021

(65) Prior Publication Data

US 2023/0117723 A1 Apr. 20, 2023

(30) Foreign Application Priority Data

Nov. 19, 2019 (JP) ................................ 2019-208588

(51) Int. Cl.
*G21F 3/02* (2006.01)
*G21F 1/08* (2006.01)
*G21F 1/10* (2006.01)

(52) U.S. Cl.
CPC ................ *G21F 3/02* (2013.01); *G21F 1/085* (2013.01); *G21F 1/106* (2013.01)

(58) Field of Classification Search
CPC . G21F 3/02; G21F 1/085; G21F 1/106; G21F 1/10; G21F 1/08; G21F 1/103
(Continued)

(56) References Cited

U.S. PATENT DOCUMENTS 5,856,245 A * 1/1999 Caldwell .............. D06N 3/0002 604/374
8,803,115 B2 * 8/2014 Leucht ................ D06M 15/295 442/131
(Continued)

FOREIGN PATENT DOCUMENTS

JP H06180387 A 6/1994
JP 2001271212 A 10/2001
(Continued)

OTHER PUBLICATIONS

Extended European Search Report (EESR) of Sep. 28, 2023, issued for the corresponding EP patent application No. 20889286.9.
(Continued)

*Primary Examiner* — Kiet T Nguyen
(74) *Attorney, Agent, or Firm* — Endurance Law Group PLC; James R. Yee

(57) ABSTRACT

A radiation shielding material includes a main body having communication air holes and made of a base member constituting a three-dimensional reticulate skeletal structure, and a metal having radiation shielding capability. The radiation shielding material has moisture permeability through the communication air holes. The base member contains fibers, a foam material, a porous material, or a spongy material. The metal is provided in the form of a film so as to cover the surfaces of the base member of the main body. The radiation shielding material has a degree of moisture permeability of 1 g/m$^2$ h or higher measured through the A-2 method that is a water method in accordance with JIS L 1099 where the temperature is modified to 20° C. and the humidity is modified to 65% RH.

20 Claims, 1 Drawing Sheet

(58) Field of Classification Search
USPC .................................................... 250/516.1
See application file for complete search history.

(56) References Cited

U.S. PATENT DOCUMENTS

| | | | | |
|---|---|---|---|---|
| 9,475,263 | B1 | 10/2016 | Rangan et al. | |
| 2004/0004196 | A1 | 1/2004 | Demeo et al. | |
| 2016/0060791 | A1* | 3/2016 | Apell | G21F 1/106 442/209 |

FOREIGN PATENT DOCUMENTS

| | | | |
|---|---|---|---|
| JP | 2003004893 | A | 1/2003 |
| JP | 3098317 | U | 2/2004 |
| JP | 3104523 | U | 9/2004 |
| JP | 3140666 | U | 4/2008 |
| JP | 2012132127 | A | 7/2012 |
| JP | 2014002029 | A | 1/2014 |
| JP | 2014130050 | A | 7/2014 |
| JP | 2015160976 | A | 9/2015 |
| JP | 2018020833 | A | 2/2018 |
| JP | 3219869 | U | 1/2019 |
| JP | 2021081302 | A | 5/2021 |
| WO | 2016185997 | A1 | 11/2016 |

OTHER PUBLICATIONS

Office Action dated Sep. 30, 2023, in the corresponding KR patent application No. 10-2022-7012298 and the English translation.

Office Action dated Mar. 22, 2023 issued in Japanese Patent Application No. 2019-208589 and English translation, 6 pages.

* cited by examiner

RADIATION SHIELDING MATERIAL

RELATED APPLICATIONS

This application is a national stage application of international patent application number PCT/JP2020/038134, filed on Oct. 19, 2020, which claims priority to Japanese Patent Application No. 2019-208588, filed on Nov. 19, 2019, the entire disclosures of which is hereby incorporated by reference and relied upon.

TECHNICAL FIELD

The present disclosure relates to a radiation shielding material for shielding radiation.

BACKGROUND ART

Radiation protective clothing has been traditionally developed to prevent an operator from being exposed to radiation when the operator works in the presence of radioactive materials in a place, such as hospital, laboratory, or nuclear facility. In general, such radiation protective clothing typically includes a radiation shielding material in the form of a sheet fabricated by uniformly mixing a metal, such as lead or tungsten, having radiation shielding capability into a rubber or a synthetic resin, such as vinyl chloride resin.

Unfortunately, such radiation protective clothing including the radiation shielding material has not only heavy weight but also inferior breathability. In order to mitigate the heat and humidity inside the clothing, various improvements have been made. For example, Patent Literature 1 discloses radiation protective clothing having an internal structure for wearing, on which a sheet coated with a lining fabric, such as mesh-like fabric, having breathability is sewed, in order to mitigate heat and humidity due to sweating.

Patent Literature 2 discloses protective clothing that includes a sheet containing a heavy metal as a protective material and is openable and closable by a fastener on the front body. This protective clothing is designed to allow ambient air introduced with fans installed in the back body of the protective clothing to flow inside the protective clothing and be discharged through sleeves and a collar.

CITATION LIST

Patent Literature

Patent Literature 1: Japanese Utility Model Registration No. 3098317.

Patent Literature 2: Japanese Utility Model Registration No. 3140666.

SUMMARY OF INVENTION

Technical Problem

Despite of various improvements, the existing radiation protective clothing still has inferior breathability, so that the operator suffers from heat and humidity inside the clothing and bears a heavy burden.

An objective of the present disclosure, which has been accomplished in view of this situation, is to provide a radiation shielding material excellent in both of radiation shielding performance and moisture permeability.

Solution to Problem

A radiation shielding material according to a first aspect of the present disclosure includes a main body having communication air holes and made of a base member constituting a three-dimensional reticulate skeletal structure, and a metal having radiation shielding capability. The radiation shielding material has moisture permeability through the communication air holes.

In a radiation shielding material according to a second aspect of the present disclosure, the base member contains fibers, a foam material, a porous material, or a spongy material.

In a radiation shielding material according to a third aspect of the present disclosure, the metal is provided in the form of a film so as to cover the surfaces of the base member of the main body.

A radiation shielding material according to a fourth aspect of the present disclosure has a degree of moisture permeability of 1 g/m2 h or higher measured through the A-2 method, which is a water method, in accordance with JIS L 1099 where the temperature is modified to 20° C. and the humidity is modified to 65% RH.

In a radiation shielding material according to a fifth aspect of the present disclosure, the main body is a woven fabric made of polyester fibers.

In a radiation shielding material according to a sixth aspect of the present disclosure, the metal is lead.

Advantageous Effects of Invention

The present disclosure can provide a radiation shielding material excellent in both of radiation shielding performance and moisture permeability.

DESCRIPTION OF EMBODIMENTS

Figure 1:
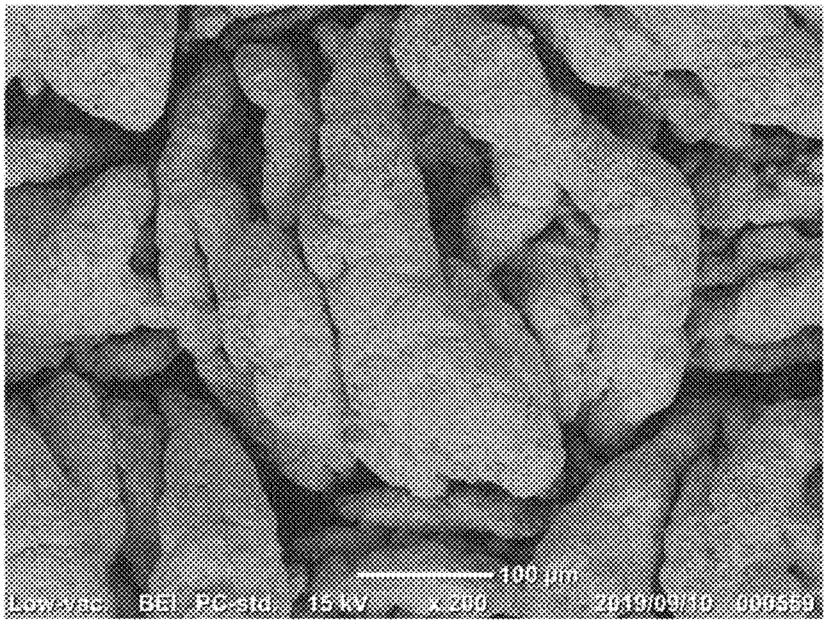
FIG. 1 is an electron microscopic picture of a radiation shielding material in Example of the present disclosure.
Figure 2:
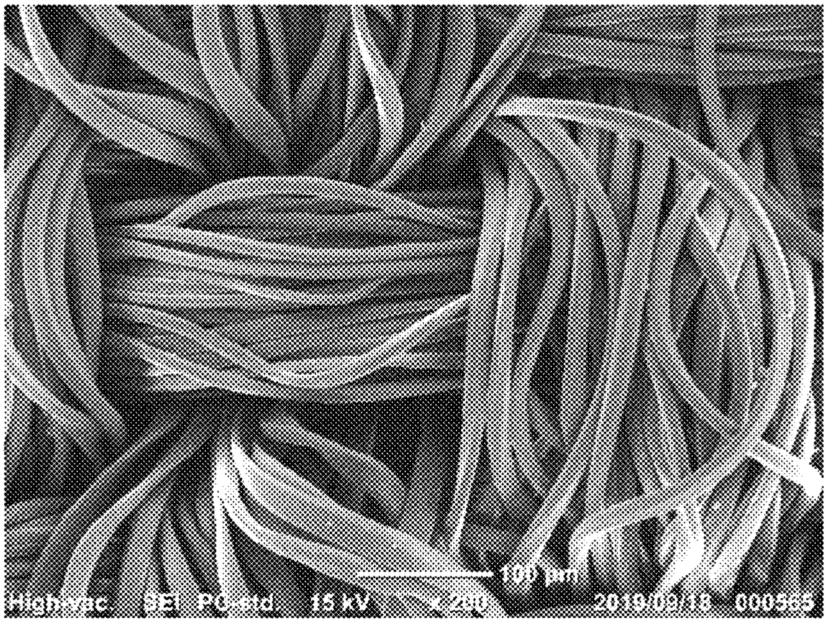
FIG. 2 is an electron microscopic picture of a main body before being provided with films in the radiation shielding material illustrated in FIG. 1 according to the present disclosure.

An embodiment of the present disclosure is described specifically below with reference to the accompanying drawings. FIG. 1 is an electron microscopic picture of a radiation shielding material in Example of the present disclosure. FIG. 2 is an electron microscopic picture of a main body before being provided with films in the radiation shielding material illustrated in FIG. 1 according to the present disclosure.

The radiation shielding material of the present disclosure is aimed at shielding radiation. For example, the radiation shielding material is included in radiation protective clothing or tools worn or used to prevent an operator from being exposed to radiation when the operator works in the presence of radioactive materials in a place, such as hospital, laboratory, nuclear facility, military facility, or cosmic space. Examples of the radiation protective clothing include aprons, coats, skirts, pants, wears that cover substantially the whole body of the operator, caps, hats, groves, neck guards, and capes. The radiation protective clothing and tools may include multiple layers of radiation shielding materials so as to further improve the radiation shielding capability.

The radiation shielding material of the present disclosure includes a main body and a metal having radiation shielding capability. The main body contains a base member constituting a three-dimensional reticulate skeletal structure and has communication air holes. That is, the main body itself is made of a base member constituting a three-dimensional reticulate skeletal structure. The three-dimensional reticulate structure constituted by the base member defines gaps, which serve as communication air holes that can connect one surface to the other surface in the thickness direction, for example. These communication air holes allow the radiation shielding material of the present disclosure to have moisture permeability.

The metal contained in the radiation shielding material of the present disclosure may be any metal having radiation shielding capability. For example, the metal is at least one element selected from the group consisting of lead, tungsten, tin, bismuth, iodine, cesium, barium, tantalum, antimony, gold, lanthanum, cerium, praseodymium, neodymium, samarium, europium, and gadolinium, having an atomic number of 40 or larger. The metal having radiation shielding capability is preferably lead because of its high radiation shielding capability.

The radiation shielding material of the present disclosure retains the three-dimensional reticulate structure of the main body and has the communication air holes, and can therefore achieve both of excellent radiation shielding performance and moisture permeability through the communication air holes.

The radiation shielding material may be any material provided that the material includes the main body of the present disclosure and a metal having radiation shielding capability and has moisture permeability through the communication air holes. Examples of the radiation shielding material include a sheet fabricated by uniformly mixing a metal, such as lead or tungsten, having radiation shielding capability into a rubber or a synthetic resin, such as vinyl chloride resin or polyurethane, a sheet fabricated by weaving fibers made of a synthetic resin or the like containing this metal, and a material fabricated by plating, coating, or spraying the metal on a sheet-like base member, such as woven fabric, so as to have moisture permeability through the communication air holes.

The base member and the main body may be any member and body. The base member is preferably made of fibers, foam materials, porous materials, or spongy materials. Examples of the main body containing the base member include a woven fabric made of fibers, a knitted fabric, a nonwoven fabric, a foam body made of a foam material prepared by foaming a synthetic resin or the like, a porous body made of a porous material, such as ceramic or mineral, and a spongy body made of a natural or synthetic spongy material.

The radiation shielding material of the present disclosure preferably includes films of a metal having radiation shielding capability so as to cover the surfaces of the base member of the main body. That is, the entire surfaces of the radiation shielding material of the present disclosure are provided with not substantially-flat metal layers, but metal films formed by plating, coating, or spraying a metal so as to cover the surfaces of the base member constituting a three-dimensional reticulate skeletal structure of the main body. These features are clearly illustrated in FIG. 1, which is an electron microscopic picture (×200) of the radiation shielding material in Example of the present disclosure, and FIG. 2, which is an electron microscopic picture (×200) of the main body (sateen) before being provided with the films in the radiation shielding material illustrated in FIG. 1 according to the present disclosure.

The radiation shielding material of the present disclosure is provided with the films of the metal having radiation shielding capability so as to cover the surfaces of the base member included in the main body, and thus retains the three-dimensional reticulate structure of the main body without filling the structure and has the communication air holes. The radiation shielding material can therefore achieve both of excellent radiation shielding performance because of the films of the metal having radiation shielding capability, and moisture permeability through the communication air holes.

The radiation shielding material of the present disclosure has moisture permeability, and thus has a degree of moisture permeability higher than 0 $g/m^2$ h. The radiation shielding material preferably has a degree of moisture permeability of 1 $g/m^2$ h or higher measured through the A-2 method, which is a water method, in accordance with JIS L 1099 where the temperature is modified to 20° C. and the humidity is modified to 65% RH.

The radiation shielding performance and the moisture permeability in a radiation shielding material have been assumed to be contradictory functions. This assumption has inhibited discussion of the moisture permeability of the radiation shielding material.

A representative example of the material having moisture permeability is a moisture-permeable water-proof fabric. The moisture-permeable water-proof fabric is included in outdoor wear, skiwear, rainwear, and diaper covers, for example. A moisture-permeable water-proof fabric having a degree of moisture permeability of 150 $g/m^2$ h or higher (measured through the A-1 method) is evaluated to have excellent moisture permeability. In general, a moisture-permeable water-proof fabric is provided with high moisture permeability in order to solve a problem of high humidity inside clothing caused by sweating during intensive exercise, for example. The moisture-permeable water-proof fabric is therefore required to have a high degree of moisture permeability.

In contrast, radiation protective clothing including a radiation shielding material is basically intended for use during manipulation of machines in an indoor space under controlled temperature and humidity. The radiation shielding material must thus be designed in view of high humidity inside clothing due to insensible perspiration (moisture dissipation except for sweating). A standard level of the insensible perspiration has been deemed as 23 $g/m^2$ h in the case where a person is at rest under comfortable temperature (refer to Non-Patent Literature 1: "Perspiration" written by Yas Kuno and published by Kouseikan Co., Ltd.)).

A degree of moisture permeability, which is used as a measure in evaluation of moisture permeability, significantly varies depending on measuring methods. The testing methods for moisture permeability of textiles in JIS L 1099:2012 include the A-1 method (calcium chloride method), A-2 method (water method), B-1 method (potassium acetate method), B-2 method (alternative method I of the potassium acetate method), B-3 method (alternative method II of the potassium acetate method), and C method (sweating hot-plate method).

The above-mentioned level of insensible perspiration is determined by measuring evaporation of moisture from skin surfaces using a human-body balance scale in the form of a variation in body weight. Accordingly, the degree of moisture permeability, which corresponds to a mass of water vapor passing through the radiation shielding material of the present disclosure in an indoor space under controlled temperature and humidity, is preferably measured through the A-2 method (water method) in which the temperature is modified to 20° C. and the humidity is modified to 65% RH.

The radiation shielding material of the present disclosure measured through this method has moisture permeability, and thus, the degree of moisture permeability thereof is higher than 0 $g/m^2$ h, preferably 1 $g/m^2$ h or higher, more preferably 5 $g/m^2$ h or higher, and still more preferably 15 $g/m^2$ h or higher.

The degree of moisture permeability of the radiation shielding material of the present disclosure measured through an alternative A-1 method (calcium chloride method) is higher than 0 $g/m^2$ h, preferably 50 $g/m^2$ h or higher, more preferably 150 $g/m^2$ h or higher, and still more preferably 300 $g/m^2$ h or higher.

The above-described radiation shielding material of the present disclosure having excellent moisture permeability applied to radiation protective clothing can inhibit an increase in humidity inside the clothing while an operator is wearing the clothing.

The main body may be made of any material selected from inorganic materials and organic materials. Examples of the inorganic materials include glass, such as silicate glass and acrylic glass, and ceramic, such as silica and alumina. Examples of the organic materials include woods, natural resins, synthetic resins, natural rubbers, synthetic rubbers, paper, natural fibers, synthetic fibers, and woven fabrics made of natural fibers or synthetic fibers.

Examples of the synthetic resins include polyethylene terephthalate (PET), polyethylene (PE), polypropylene (PP), polyurethane, and polyvinyl chloride. Examples of the synthetic fibers include nylon fibers, polyester fibers, polyolefin fibers, acrylic fibers, and polyurethane fibers. Examples of the woven fabrics made of natural fibers or synthetic fibers include woven cotton fabrics, polyester-containing woven fabrics, acryl-containing woven fabrics, and polyurethane-containing woven fabrics.

The main body may be made of not only a single inorganic or organic material but also a mixture of multiple inorganic materials, a mixture of multiple organic materials, and a mixture of inorganic and organic materials. The main body of the present disclosure is preferably a woven fabric made of fibers, specifically, a woven fabric made of polyester fibers. The radiation shielding material is preferably fabricated by providing lead plating films on a woven fabric made of 100% polyester.

A procedure of plating a metal on an insulating main body, such as the woven polyester fabric, essentially involves a step of roughening the surfaces of the main body, a step of allowing a catalyst to be adsorbed on the roughened surfaces of the main body, a step of metalizing the catalyst and thus forming metal films on the surfaces of the main body, and a step of forming plating films of a metal having radiation shielding capability on the metal films. This procedure can provide the surfaces of the fibers of the woven fabric with metal plating films having a thickness sufficient to achieve radiation shielding performance.

EXAMPLE

A radiation shielding material in Example of the present disclosure is described below, although this Example is not intended to limit the scope of the present disclosure. The radiation shielding material was evaluated in the procedures described below.

Rate of Direct Air Holes

In order to determine a ratio of direct air holes, a test piece was irradiated with light from the bottom, and light passing through the test piece was captured with a stereoscopic microscope (×40). The resulting image was then input to a computer and converted into an image through a black-and-white binarization process using the image analysis software "Particle Analysis version 3.5" produced by Nippon Steel & Sumikin Technology Co., Ltd. The area of air holes in the image was measured and a ratio of direct air holes (P) was then calculated in Expression (1) below:

$$P=Pw/Pa\times 100[\%] \quad (1)$$

where Pw [pix] indicates the number of pixels corresponding to the air holes, and Pa [pix] indicates the number of all the pixels.

Degree of Moisture Permeability: A-2 Method

The degree of moisture permeability was measured though the partially modified A-2 method (water method) in accordance with JIS L 1099:2012. Three test pieces having a diameter of 70 mm were sampled. The test pieces were examined in a room under a constant temperature of 20° C. and a constant humidity of 65% RH, instead of in a device under a constant temperature of 40±2° C. and a constant humidity of 50±5% RH as prescribed in the A-2 method.

Degree of Moisture Permeability: A-1 Method

The degree of moisture permeability was measured through the A-1 method (calcium chloride method) in accordance with JIS L 1099:2012. Three test pieces having a diameter of 70 mm were sampled and examined in a device under a constant temperature of 40° C. and a constant humidity of 95% RH.

Fabrication of Radiation Shielding Material

The radiation shielding material in Example of the present disclosure was fabricated by providing lead plating films on a woven polyester fabric made of polyester fibers. The material was fabricated as is described below.

First, a woven polyester fabric was subject to a degreasing process in order to remove stains from the surfaces. Specifically, a degreasing agent was applied to swell, isolate, and remove stains, such as oil substance, from the surfaces of the woven polyester fabric. In this Example, the applied degreasing agent was the alkaline degreasing agent "Ace Clean A-220 (commercial name)" manufactured by Okuno Chemical Industries Co., Ltd. The woven polyester fabric was immersed in a solution containing 30 to 50 g/L Ace Clean A-220 for five minutes. The woven polyester fabric was then extracted and washed with water.

The degreased surfaces of the woven polyester fabric were then roughened and subject to a surface treatment for improving the adhesion. The surface treatment involved immersing the woven polyester fabric in a solution containing 400 g/L potassium hydroxide for one to three minutes. The potassium hydroxide solution was maintained within a temperature range of 40±5° C. during the treatment. The woven polyester fabric was then extracted and washed with water.

The woven polyester fabric was then subject to a first activation process for providing an electric potential to the surfaces of the woven polyester fabric and thus facilitating adsorption of a catalyst in a subsequent catalyst adsorption process. In this Example, the applied surface adjusting agent was the plating chemical for plastic "Condirizer FR Conc. (commercial name)" manufactured by Okuno Chemical Industries Co., Ltd. The woven polyester fabric was immersed in a solution containing 50 ml/L Condirizer FR Conc. for one to three minutes.

The woven polyester fabric then underwent a process of allowing a catalyst to be adsorbed on the surfaces of the woven polyester fabric. In this Example, the applied catalyst was palladium chloride ($Pd(II)Cl_2$). In order to allow the palladium chloride catalyst to be adsorbed on the surfaces of the woven polyester fabric, the plating chemical for plastic "Catalyst C (commercial name)" manufactured by Okuno Chemical Industries Co., Ltd. was applied as a catalyst providing agent. The woven polyester fabric was immersed in a solution containing 60 ml/L Catalyst C and 180 to 200 ml/L concentrated hydrochloric acid for one to three minutes.

The woven polyester fabric was then subject to a second activation process for metallizing the palladium chloride adsorbed on the surfaces of the woven polyester fabric. In this Example, the applied activating agent was "OPC-555 Accelerator M (commercial name)" manufactured by Okuno Chemical Industries Co., Ltd. The woven polyester fabric on which the palladium chloride catalyst was adsorbed was immersed in a solution containing 100 ml/L OPC-555 Accelerator M for one to three minutes. This process metalized the palladium chloride adsorbed on the surfaces of the woven polyester fabric and yielded metallic palladium.

The surfaces of the woven polyester fabric were then provided with copper plating films by displacement plating on the metallic palladium on the surfaces of the woven polyester fabric. The woven polyester fabric on which the metallic palladium was adsorbed was immersed in an electroless copper plating solution containing formaldehyde as a reducing agent and thereby underwent an electroless copper plating process. The applied electroless copper plating solution was a plating solution containing formaldehyde as a reducing agent. The temperature of the electroless copper plating solution was controlled within a range of 40±5° C. The rate of formation of the copper plating films was 1 μm per 10 minutes.

The woven polyester fabric provided with the copper plating films on its surfaces then underwent a lead plating process. The conditions of the lead plating process were optimized for the woven polyester fabric provided with the copper plating films, because the thickness of the lead plating films formed by the lead plating process varies depending on the period and the amount of power supply. In this Example, the lead plating solution applied in the lead plating process had components below:

| | |
|---|---|
| $Pb(BF_4)_2$ | 300 g/L |
| $HBF_4$ | 30 g/L |
| $H_3BO_4$ | 40 g/L |

The woven polyester fabric provided with the copper plating films was immersed in this plating solution, and then subject to the lead plating process under the conditions of a tank voltage of 6 V and a temperature of the plating solution of 30±5° C. The rate of formation of the lead plating films in the case of supply of a current of 17.4 A per 100 $cm^2$ was 10 μm per minute. This process succeeded to produce lead plating films on the surfaces of the woven polyester fabric.

The following description is directed to results of examination of test pieces sampled from the radiation shielding material fabricated as described above.

Ratio of Direct Air Holes

The ratio of direct air holes in the radiation shielding material in this Example was 0%. The ratio of direct air holes of a comparative example, which is the main body (sateen) before being provided with the plating films in the radiation shielding material in this Example, was found to be 6.2%. The ratio of direct air holes of a reference example, which is a cotton broadcloth woven by a procedure different from that of the main body in this Example, was found to be 41.8%. The radiation shielding material in this Example was examined in accordance with JIS T 61331-1 (reverse broad beam) to determine an amount of penetrating X-rays, and the lead equivalent (110 kV) was confirmed to be higher than 0.00 mmPb. The radiation shielding material of the present disclosure has a ratio of direct air holes of 0% and is provided with lead plating films on the surfaces of fibers contained in the woven fabric, and therefore has excellent radiation shielding performance.

Degree of Moisture Permeability: A-2 Method

The radiation shielding material in this Example had a degree of moisture permeability of 22.96 $g/m^2$ h. The degree of moisture permeability of a comparative example, which is a commercially available moisture-permeable water-proof fabric ("New Cube M-4874" manufactured by Murata Cho Co., Ltd.), was found to be 27.69 $g/m^2$ h. The degree of moisture permeability of a reference example, which is a radiation shielding sheet fabricated by uniformly mixing lead into a vinyl chloride resin and included in commercially available radiation protective clothing of an apron type, was found to be 0.00 $g/m^2$ h. That is, the radiation shielding material of the present disclosure has excellent moisture permeability close to that of general moisture-permeable water-proof fabrics.

Degree of Moisture Permeability: A-1 Method

The radiation shielding material in this Example had a degree of moisture permeability of 384 $g/m^2$ h. The radiation shielding material of the present disclosure has excellent moisture permeability.

The radiation shielding material in Example of the present disclosure retains the three-dimensional reticulate structure of the main body and has communication air holes, and is therefore excellent in both of radiation shielding performance and moisture permeability. The radiation shielding material of the present disclosure applied in radiation protective clothing, for example, can mitigate the heat and humidity while an operator is wearing the clothing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-208588, filed on Nov. 19, 2019, the entire disclosure of which is incorporated by reference herein.

INDUSTRIAL APPLICABILITY

As described above, the present disclosure can provide a radiation shielding material excellent in both of radiation shielding performance and moisture permeability.

What is claimed is:

1. A radiation shielding material for shielding radiation, the radiation shielding material comprising:

a main body having communication air holes, the main body being made of a base member constituting a three-dimensional reticulate skeletal structure; and a metal having radiation shielding capability, wherein the radiation shielding material has moisture permeability through the communication air holes, wherein the metal is applied to the base member by the steps of:

roughening surfaces of the base member;

allowing a catalyst to be absorbed by the roughened surfaces of the base member; and, forming layers of the metal on the surfaces of the base member using a plating process.

2. The radiation shielding material according to claim 1, wherein the base member is made of fibers, a foam material, a porous material, or a spongy material.

3. The radiation shielding material according to claim 1, wherein the radiation shielding material has a degree of moisture permeability of 1 g/m$^2$ h or higher measured through an A-2 method that is a water method in accordance with JIS L 1099 where a temperature is modified to 20° C. and a humidity is modified to 65% RH.

4. The radiation shielding material according to claim 1, wherein the main body is a woven fabric made of polyester fibers.

5. The radiation shielding material according to claim 1, wherein the metal is lead.

6. The radiation shielding material, as set forth in claim 1, wherein a degreasing process is applied to the base member prior to the step of roughening the surfaces of the base member.

7. The radiation shielding material, as set forth in claim 1, wherein the step of roughening the surfaces of the base member includes the step of immersing the base member in a solution containing potassium hydroxide.

8. The radiation shielding material, as set forth in claim 7, wherein the step of allowing a catalyst to be absorbed by the roughened surfaces of the base member includes the steps of:

subjecting the base member to a first activation process for providing an electrical potential to the roughened surfaces of the base member; and, subjecting the base member to a second activation process after the catalyst was absorbed by the roughened surfaces of the base member.

9. The radiation shielding material, as set forth in claim 8, wherein the step of forming layers of the metal on the surfaces of the base member includes the steps of:

subjecting the base member in which the catalyst has been absorbed to a first plating process by immersing the base member in a copper plating solution containing formaldehyde as a reducing agent; and, subjecting the base member with copper plating to a lead plating process.

10. A radiation shielding material for shielding radiation, the radiation shielding material comprising:

a main body having communication air holes, the main body being made of a base member constituting a three-dimensional reticulate skeletal structure; and a metal having radiation shielding capability, wherein the radiation shielding material has moisture permeability through the communication air holes, and the metal is provided in form of a film so as to cover surfaces of the base member of the main body, wherein the metal is provided using the steps of:

the roughening surfaces of the base member;

allowing a catalyst to be absorbed by the roughened surfaces of the base member; and, forming the film of the metal on the surfaces of the base member using a plating process.

11. The radiation shielding material according to claim 10, wherein the radiation shielding material has a degree of moisture permeability of 1 g/m$^2$ h or higher measured through an A-2 method that is a water method in accordance with JIS L 1099 where a temperature is modified to 20° C. and a humidity is modified to 65% RH.

12. The radiation shielding material according to claim 11, wherein the main body is a woven fabric made of polyester fibers.

13. The radiation shielding material according to claim 12, wherein the metal is lead.

14. The radiation shielding material according to claim 10, wherein the main body is a woven fabric made of polyester fibers.

15. The radiation shielding material according to claim 10, wherein the metal is lead.

16. A method associated with a radiation shielding material for shielding radiation, the radiation shielding material including a main body and a metal, the main body having communication air holes and being composed of a base member constituting a three-dimensional reticulate skeletal structure, the metal having radiation shielding capability, the radiation shielding material having moisture permeability through the communication air holes, the method including the steps of:

roughening surfaces of the base member;

allowing a catalyst to be absorbed by the roughened surfaces of the base member; and, forming layers of the metal on the surfaces of the base member using a plating process.

17. The method, as set forth in claim 16, including the step of applying a degreasing process to the base member prior to the step of roughening the surfaces of the base member.

18. The method, as set forth in claim 16, wherein the step of roughening the surfaces of the base member includes the step of immersing the base member in a solution containing potassium hydroxide.

19. The method, as set forth in claim 18, wherein the step of allowing a catalyst to be absorbed by the roughened surfaces of the base member includes the steps of:

subjecting the base member to a first activation process for providing an electrical potential to the roughened surfaces of the base member; and, subjecting the base member to a second activation process after the catalyst was absorbed by the roughened surfaces of the base member.

20. The method, as set forth in claim 19, wherein the step of forming the layers of the metal on the surfaces of the base member includes the steps of:

subjecting the base member in which the catalyst has been absorbed to a first plating process by immersing the base member in a copper plating solution containing formaldehyde as a reducing agent; and, subjecting the base member with copper plating to a lead plating process.

* * * * *